(12) United States Patent
Millsap et al.

(10) Patent No.: US 7,775,392 B2
(45) Date of Patent: Aug. 17, 2010

(54) DOUBLE-WALLED BAKING TRAY HAVING IMPROVED BAKING CHARACTERISTICS

(75) Inventors: André David Millsap, Reynoldsburg, OH (US); Paul Metaxatos, Swampscott, MA (US)

(73) Assignees: SEB S.A., Rumilly (FR); Groupe SEB USA, West Orange, NJ (US)

( * ) Notice: Subject to any disclaimer, the term of this patent is extended or adjusted under 35 U.S.C. 154(b) by 143 days.

(21) Appl. No.: 11/326,254

(22) Filed: Jan. 5, 2006

(65) Prior Publication Data
US 2007/0151976 A1 Jul. 5, 2007

(51) Int. Cl.
*A47J 37/01* (2006.01)
(52) U.S. Cl. .................................. 220/573.1
(58) Field of Classification Search ............. 220/573.1, 220/573.3, 608, 607, 604, 665, 678, 677, 220/623, 610, 600, 660; 99/425, 445, 444, 99/DIG. 15; D7/359, 323; D9/431, 430; *A47J 37/01, A47J 37/00*
See application file for complete search history.

(56) References Cited

U.S. PATENT DOCUMENTS

| | | | | |
|---|---|---|---|---|
| 75,673 | A | * | 3/1868 | Gibson ......................... 99/425 |
| 254,770 | A | * | 3/1882 | Hurd ............................. 99/450 |
| 284,295 | A | * | 9/1883 | Hailes .......................... 99/444 |
| 495,872 | A | * | 4/1893 | Ball ............................. 249/117 |
| D32,756 | S | * | 5/1900 | Hubert ......................... D7/359 |
| 936,343 | A | * | 10/1909 | Musser ......................... 99/426 |
| 1,093,648 | A | | 4/1914 | Potter |
| 1,361,364 | A | | 12/1920 | Burlingham |
| 1,749,433 | A | | 3/1930 | Kussa et al. |
| D97,841 | S | * | 12/1935 | Cohen ......................... D7/409 |
| 2,042,993 | A | | 6/1936 | Hopes |
| 2,057,951 | A | | 10/1936 | Ingram et al. |

(Continued)

FOREIGN PATENT DOCUMENTS

FR 2643545 A1 * 8/1990

(Continued)

OTHER PUBLICATIONS

Andre David Millsap et al., Copending U.S. Appl. No. 29/251,208, filed Jan. 5, 2006.

(Continued)

*Primary Examiner*—Anthony Stashick
*Assistant Examiner*—Robert J Hicks
(74) *Attorney, Agent, or Firm*—The Webb Law Firm (57) ABSTRACT

A baking tray includes a top sheet and a bottom sheet. The top sheet has a first top side, a first bottom side, and a first outer perimeter. The first top side includes a first horizontal surface configured for supporting food for cooking in an oven. The bottom sheet has a second top side, a second bottom side, and a second outer perimeter. The second bottom side includes a second horizontal surface configured for supporting the baking tray upon an oven rack. The bottom sheet is attached to the top sheet at an interface adjacent to the first outer perimeter and the second outer perimeter. The second horizontal surface comprises dimple portions and flat portions. The flat portions separate the dimple portions and are spaced from the top sheet. Each of the dimple portions is indented toward the top sheet.

15 Claims, 7 Drawing Sheets

U.S. PATENT DOCUMENTS

| | | | |
|---|---|---|---|
| 2,078,102 A | 4/1937 | Siela | |
| 2,151,535 A | 3/1939 | Scurlock | |
| 2,174,425 A | 9/1939 | Schlumbohm | |
| 2,214,422 A * | 9/1940 | Kronquest | 220/62 |
| 2,618,258 A | 11/1952 | Kroyer | |
| D187,304 S * | 2/1960 | Hopper et al. | D9/425 |
| 3,127,828 A * | 4/1964 | Fine | 99/446 |
| D199,593 S | 11/1964 | Reifers | |
| 3,209,978 A * | 10/1965 | Dupuis | 206/205 |
| 3,256,806 A * | 6/1966 | Jordan | 99/444 |
| 3,558,002 A | 1/1971 | Lindgren | |
| 3,640,209 A | 2/1972 | Wilson | |
| 3,799,048 A | 3/1974 | Finley | |
| D242,052 S | 10/1976 | Van Ness | |
| 4,169,006 A * | 9/1979 | Matsubara et al. | 156/182 |
| D258,711 S | 3/1981 | Baker et al. | |
| D263,268 S | 3/1982 | Rein | |
| 4,367,243 A * | 1/1983 | Brummett et al. | 426/303 |
| D274,781 S * | 7/1984 | Baker et al. | D7/359 |
| 4,595,120 A | 6/1986 | Logan et al. | |
| D288,396 S | 2/1987 | Ritman | |
| 4,676,151 A | 6/1987 | Gorsuch et al. | |
| 4,785,968 A | 11/1988 | Logan et al. | |
| D309,234 S | 7/1990 | Howell | |
| 4,941,585 A | 7/1990 | Hare et al. | |
| 5,351,608 A | 10/1994 | Muchin et al. | |
| 5,399,439 A | 3/1995 | Rasmussen | |
| 5,644,976 A | 7/1997 | Muchin et al. | |
| 5,676,276 A | 10/1997 | Zielinski et al. | |
| 5,806,410 A | 9/1998 | Muchin et al. | |
| 5,845,805 A | 12/1998 | Ragland | |
| 5,871,661 A | 2/1999 | Swisher et al. | |
| 5,878,656 A * | 3/1999 | Fletcher et al. | 99/340 |
| 5,921,173 A | 7/1999 | Grycan et al. | |
| D427,009 S | 6/2000 | Iyengar et al. | |
| D431,958 S | 10/2000 | Harris | |
| 6,279,469 B1 | 8/2001 | Bailey | |
| 6,279,771 B1 | 8/2001 | Bryant | |
| D464,846 S | 10/2002 | Black | |
| D481,584 S | 11/2003 | Nolan | |
| D489,567 S | 5/2004 | Groll | |
| D489,568 S | 5/2004 | Groll | |
| D490,644 S | 6/2004 | Groll | |
| D493,256 S | 7/2004 | Kim | |

FOREIGN PATENT DOCUMENTS

FR     2643806 A1 *  9/1990

OTHER PUBLICATIONS

Andre David Millsap et al., Copending U.S. Appl. No. 29/251,206, filed Jan. 5, 2006.
Andre David Millsap et al., Copending U.S. Appl. No. 29/251,207, filed Jan. 5, 2006.
Andre David Millsap et al., Copending U.S. Appl. No. 29/251,265, filed Jan. 5, 2006.
Andre David Millsap et al., Copending U.S. Appl. No. 29/251,209, filed Jan. 5, 2006.
Andre David Millsap et al., Copending U.S. Appl. No. 29/251,249, filed Jan. 5, 2006.

* cited by examiner

DOUBLE-WALLED BAKING TRAY HAVING IMPROVED BAKING CHARACTERISTICS

TECHNICAL FIELD

The present invention relates to cooking implements, and more particularly to trays to facilitate the baking of food in an oven.

BACKGROUND OF THE INVENTION

Single-layer bakeware is formed from a single sheet of metal. In use, food is placed on the sheet and the sheet is then inserted into an oven such that it rests upon an oven rack. As the sheet contacts both the food and the oven rack, heat is directly conducted from the oven rack to the bottom of the food, and the bottom of the food is thereby prone to burning.

Conventional insulated bakeware is typically formed by attaching two sheets of metal together in a parallel and spaced relationship so that one of the sheets serves as a top sheet and the other of the sheets serves as a bottom sheet. In use, food is placed on the top sheet and the bakeware is then inserted into an oven with the bottom sheet resting upon an oven rack. As the space between the top sheet and the bottom sheet is filled with air, heat is not directly conducted from the oven rack to the bottom of the food, and the bottom of the food can thereby be prevented from burning. However, as compared to single-layer bakeware, required baking times are undesirably increased when conventional insulated bakeware is employed.

SUMMARY OF THE INVENTION

In accordance with one embodiment of the present invention, a baking tray comprises a top sheet and a bottom sheet. The top sheet has a first top side, a first bottom side, and a first outer perimeter. The first top side includes a first horizontal surface configured for supporting food for cooking in an oven. The bottom sheet has a second top side, a second bottom side, and a second outer perimeter. The second bottom side includes a second horizontal surface configured for supporting the baking tray upon an oven rack. The bottom sheet is attached to the top sheet at an interface adjacent to the first outer perimeter and the second outer perimeter. The second horizontal surface comprises dimple portions and flat portions. The flat portions separate the dimple portions and are spaced from the top sheet. Each of the dimple portions are indented toward the top sheet. The dimple portions are substantially evenly distributed across the entirety of the second horizontal surface, such that the first horizontal surface is substantially evenly heated by the second horizontal surface when the baking tray is placed into a heated oven, and such that the first horizontal surface is heated more rapidly than that of a baking tray of similar construction but not having the substantially evenly distributed dimple portions.

In accordance with another embodiment of the present invention, a baking tray comprises a top sheet and a bottom sheet. The top sheet has a first top side, a first bottom side, and a first outer perimeter. The first top side includes a first horizontal surface configured for supporting food for cooking in an oven. The bottom sheet has a second top side, a second bottom side, and a second outer perimeter. The second bottom side includes a second horizontal surface configured for supporting the baking tray upon an oven rack. The bottom sheet is attached to the top sheet at an interface adjacent to the first outer perimeter and the second outer perimeter. The second horizontal surface comprises dimple portions and flat portions. The flat portions separate the dimple portions and are spaced from the top sheet. Each of the dimple portions are indented toward the top sheet. Each of the dimple portions has substantially the same diameter and is spaced from every other adjacent one of the dimple portions by a distance no greater than about five times the diameter.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

The present invention and its operation are hereinafter described in detail in connection with the views of FIGS. 1-7, wherein like numbers indicate the same or corresponding elements throughout the views. Bakeware in accordance with the teachings of the present invention include at least two spaced apart metal sheets, wherein one sheet includes multiple dimple portions as described in further detail below. Through use of bakeware in accordance with the teachings of the present invention, required baking times can be reduced while still providing the reduction in food burning provided by conventional insulated bakeware.

It will be appreciated that the term "baking tray" is inclusive of a variety of baking implements (i.e., bakeware) including but not limited to baking pans and baking sheets. A baking pan can be configured in any of a variety of specific configurations such as a cake pan, pie pan, muffin pan, loaf pan, pizza pan, or a jelly roll pan. Likewise, a baking sheet can be configured in any of a variety of specific configurations such as a cookie sheet or biscuit sheet, with or without one or more raised edges.

Figure 1:
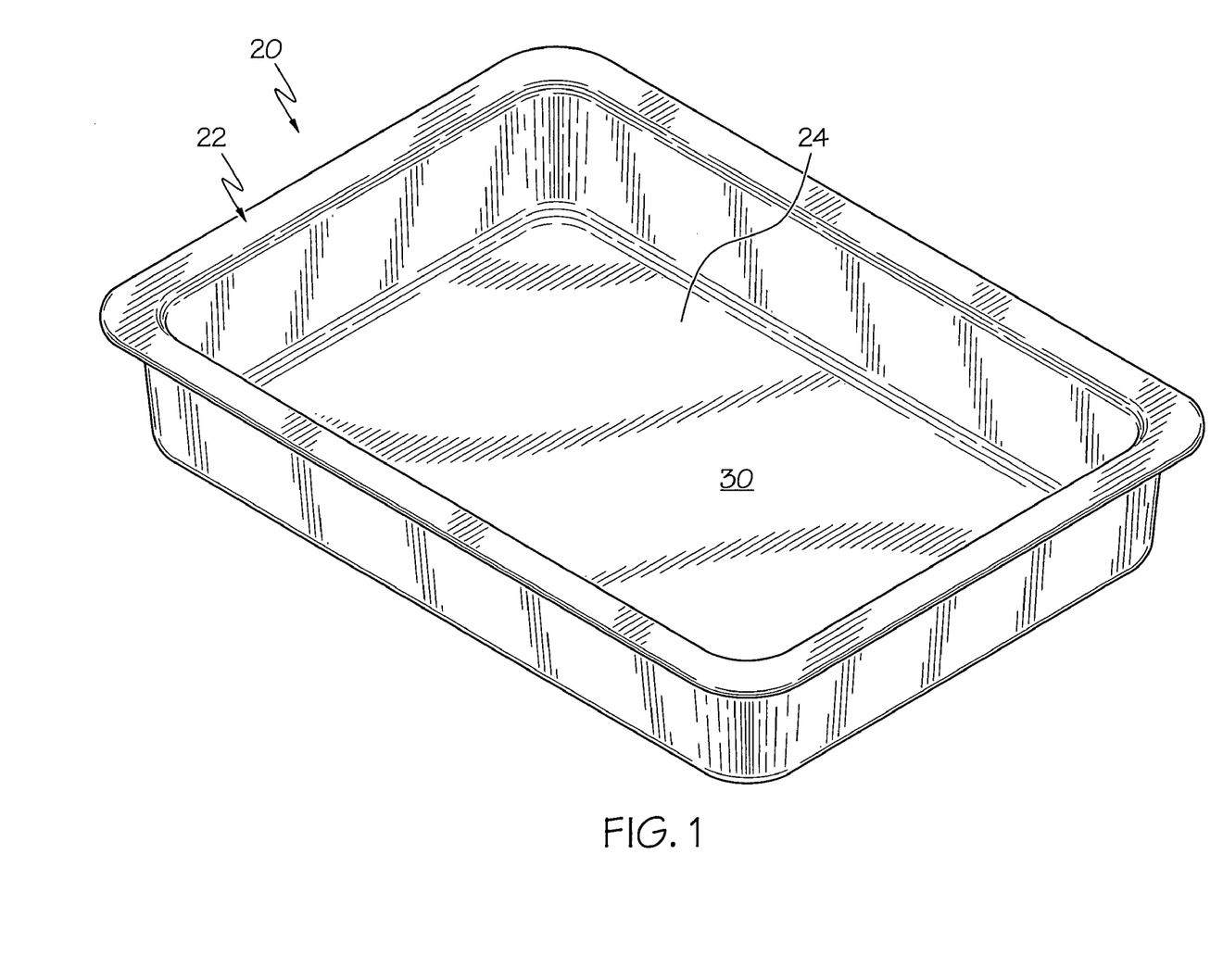
FIG. 1 is a top perspective view depicting a baking pan in accordance with one embodiment of the present invention.
Figure 2:
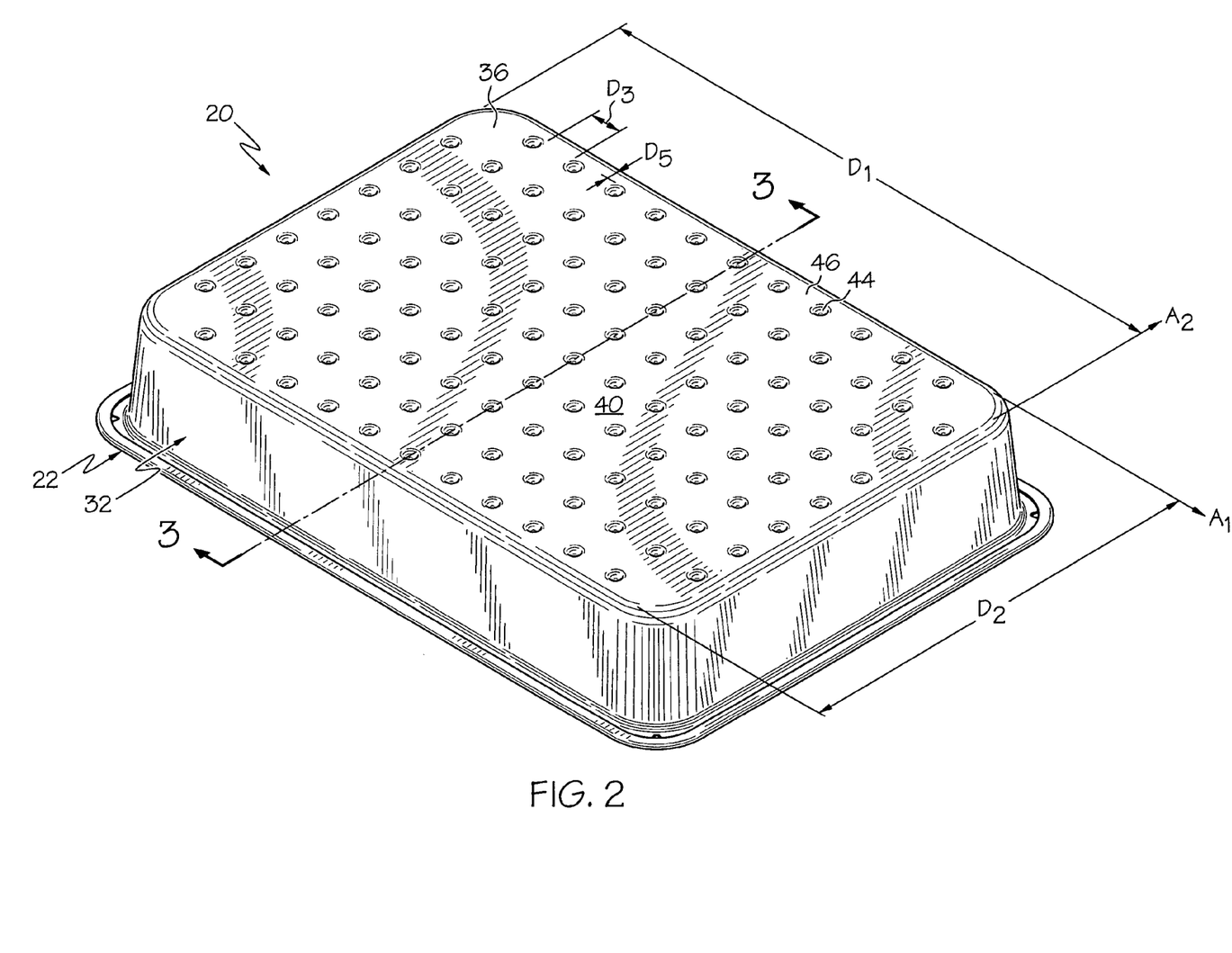
FIG. 2 is a bottom perspective view depicting the baking pan of FIG. 1.
Figure 3:
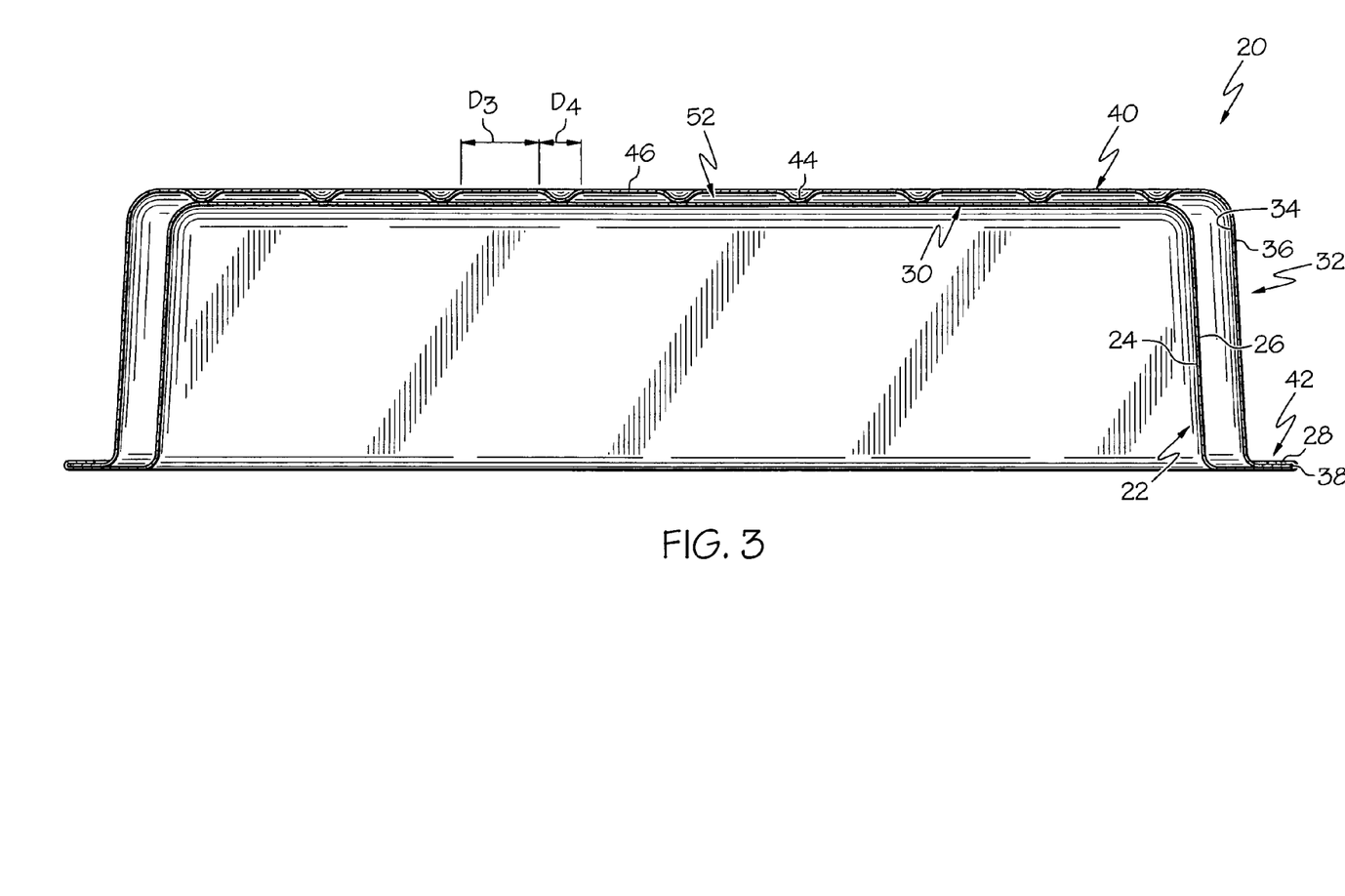
FIG. 3 is a sectional view depicting the baking pan of FIGS. 1-2 taken along section lines 3-3 of FIG. 2.

FIGS. 1-3 depict a baking pan 20 in accordance with one embodiment of the present invention. The baking pan 20 is formed by attaching a top sheet 22 to a bottom sheet 32, as best shown in FIG. 3. The attachment can occur at an interface 42 adjacent to a first outer perimeter 28 of the top sheet 22 and a second outer perimeter 38 of the bottom sheet 32. The attachment can comprise crimping (as shown), welding, gluing, rolling, and/or any of a variety of alternatives.

In one embodiment of the present invention, the top sheet 22 and the bottom sheet 32 can each comprise sheets of the same type of material (e.g., steel or aluminum). However, in another embodiment, the top sheet 22 can be formed from a different material from the bottom sheet 32. In the embodiment shown, both the top sheet 22 and the bottom sheet 32 comprise aluminum. The thickness of the top sheet 22 may or may not be the same as the thickness of the bottom sheet 32. It will be appreciated that one or more coatings can be provided on one or both of the top sheet 22 and the bottom sheet 32 to improve properties of use (e.g., a Teflon ® a coating or other coating which reduces sticking).

The top sheet 22 includes a first top side 24 and a first bottom side 26. A portion of the first top side 24 provides a first horizontal surface 30 which is suitable to support food for cooking. The bottom sheet 32 includes a second top side 34 and a second bottom side 36. A portion of the second bottom side 36 provides a second horizontal surface 40 which is suitable to contact an oven rack during use. The second horizontal surface 40 includes dimple portions 44 and flat portions 46, notwithstanding that the dimple portions 44 technically render the second horizontal surface 40 not entirely planar or horizontal. It will be appreciated that the first and second horizontal surfaces 30, 40 can assume any of a variety of shapes (e.g., square, rectangular, circular, oval, or hexagonal), although they are depicted in FIGS. 1-2 as being substantially rectangular.

Each of the dimple portions 44 comprises an indentation in the bottom sheet 32 which is directed toward the top sheet 22. The indentation can assume any of a variety of shapes including but not limited to a spherical indentation, spheroidal indentation, ellipsoidal indentation, or otherwise. Some or all of the dimple portions 44 may indent sufficiently to contact the top sheet 22 to provide underlying support for the top sheet 22. For example, in one configuration, at least some of the dimple portions can be configured to continuously touch the top sheet (e.g., see FIGS. 3 and 6). However, in an alternate configuration, at least some of the dimple portions 44 might touch the top sheet only when a weight (e.g., food) is placed on the first horizontal surface 30 of the top sheet 22 (e.g., see FIG. 7). In still another configuration, a baking tray can be configured such that none of its dimple portions contacts the top sheet under conditions of normal use.

The flat portions 46 of the bottom sheet 32 can be spaced from and substantially parallel with corresponding portions of the top sheet 22, as shown in FIG. 3. Adjacent dimple portions 44 are separated by the flat portions 46 and can be arranged in any of a variety of specific configurations. The dimple portions 44 can be provided to have a substantially uniform size and shape and/or can be substantially evenly distributed across the entirety of the second horizontal surface 40, as shown in FIG. 2, for example. In one embodiment of the present invention, substantially evenly distributed can mean that, for any given dimple portion, more than one dimple portion adjacent to that given dimple portion are spaced the same distance from that given dimple portion. It will be appreciated that an adjacent dimple portion can be one that resides closest to a given dimple portion. Dimple portions distributed substantially evenly across the entirety of the second horizontal surface can extend across the entire second horizontal surface of a baking tray in each direction, as shown in FIG. 2, for example.

The dimple portions 44 can be arranged in substantially straight rows and in substantially straight columns. In one particular embodiment, a baking tray can include at least thirty-two dimple portions. In another particular embodiment, a baking tray can include at least sixty-four dimple portions arranged into at least eight rows and at least eight columns (e.g., as shown in FIG. 2). However, it will be appreciated that a baking tray having dimple portions provided in substantially straight rows and in substantially straight columns may have absent certain dimple portions. For example, as shown in FIG. 2, the corner dimple portions (e.g., 150 in FIG. 5) might not be provided in order to facilitate easier bending of the bottom sheet 32 during manufacturing.

The dimple portions 44 can cover a significant portion of the surface area of the second horizontal surface 40. For example, in one embodiment, at least about 5% of the surface area of the second horizontal surface 40 is provided by the dimple portions 44. In another embodiment, at least about 10% of the surface area of the second horizontal surface 40 is provided by the dimple portions 44. In still another embodiment, at least about 15% of the surface area of the second horizontal surface 40 is provided by the dimple portions 44. In further embodiments, at least about 20%, 25%, 30%, 35%, 40%, 45%, 50%, 55%, 60%, 65%, 70%, 75%, 80%, 85%, and/or 90% of the surface area of the second horizontal surface is provided by the dimple portions.

It will be appreciated that each dimple portion 44 contributes a surface area to the second horizontal surface 40 which is larger than the surface area which would otherwise be contributed by a corresponding portion of the second horizontal surface 40 not having a dimple portion 44 formed therein. Accordingly, the addition of each dimple portion 44 to the second horizontal surface 40 increases the total surface area of the second horizontal surface 40, and correspondingly increases the ability of the second horizontal surface 40 to capture heat from an oven. By capturing more heat from an oven, more heat can be transferred to the food being cooked, and the food can accordingly be cooked more quickly. However, because at least a significant portion of this heat can be transferred from the bottom sheet 32 to the top sheet 22 through an air gap (e.g., 52, shown in FIG. 3) as opposed to via direct conduction, the food resting upon the first horizontal surface 30 is unlikely to burn.

The spacing of the dimple portions can, in some circumstances, relate to the overall size of the baking tray and/or its second horizontal surface. For example, as shown in FIG. 2, the second horizontal surface 40 can have a surface area which extends along perpendicular axes $A_1$ and $A_2$. The surface area of the second horizontal surface 40 is shown to extend a distance $D_1$ along axis $A_1$, and a distance $D_2$ along axis $A_2$. Each of the dimple portions can be spaced from every other adjacent one of the dimple portions by a distance (e.g., $D_3$, also shown in FIG. 3) which, in some circumstances, is no greater than about 10% of the shortest span of the surface area along either of the axes $A_1$ and $A_2$. Hence, in the example depicted in FIGS. 2-3, each of the dimple portions 44 is spaced by a distance $D_3$ which is no greater than about 10% of the shorter of $D_1$ and $D_2$. In another embodiment, each of the dimple portions is spaced from every other adjacent one of the dimple portions by a distance (e.g., $D_3$, also shown in FIG. 3) which, in some circumstances, is no greater than about 15% of the shortest span of the surface area along either of the axes $A_1$ and $A_2$, and hence is no greater than about 15% of the shorter of $D_1$ and $D_2$.

Additionally, dimple portions can be provided within a certain distance from each edge of the second horizontal surface 40, wherein that distance (e.g., shown as $D_5$ in FIG. 2) does not exceed about 10% of the shortest span of the surface area along either of the axes $A_1$ and $A_2$, and hence is no greater than about 10% of the shorter of $D_1$ and $D_2$. In another embodiment, that distance is no greater than about 15% of the shortest span of the surface area along either of the axes $A_1$ and $A_2$, and hence is no greater than about 15% of the shorter of $D_1$ and $D_2$. By providing dimple portions 44 sufficiently closely spaced to each other and/or the edges of the second horizontal surface 40 as described herein, heat can transfer substantially uniformly from the second horizontal surface 40 to the first horizontal surface 30 during use of the baking pan 20 within an oven. This substantially uniform transfer of heat helps to ensure that no "hot spots" are present on the first horizontal surface 30, and that food thereon can accordingly be evenly heated.

The spacing of the dimple portions can, in some circumstances, relate to the diameter of the dimple portions. For example, in the example of FIG. 3, each of the dimple portions 44 has substantially the same diameter $D_4$ and is spaced from every other adjacent one of the dimple portions by a distance no greater than about five times the diameter $D_4$. In other embodiments, each of the dimple portions is spaced from every other adjacent one of the dimple portions by a distance no greater than about three times the diameter of the dimple portions. The quantity of dimple portions present on a baking tray can increase as the size (e.g., dimensions $D_1$ and $D_2$) of the second horizontal surface increases. Hence, a larger baking tray can include more dimple portions than a smaller baking tray.

By providing a bottom sheet having a significant quantity of dimple portions which are substantially evenly distributed (as shown in FIG. 2, for example) the first horizontal surface of a baking tray can be substantially evenly heated by the second horizontal surface when the baking tray is placed into a heated oven. Additionally, in this configuration, the first horizontal surface can be heated more rapidly (e.g., up to about 15% faster) than that of a conventional baking tray of similar construction but not having the substantially evenly distributed dimple portions. Hence, when a baking tray in accordance with the teachings of the present invention is placed within a heated oven for a predetermined amount of time, its first horizontal surface can reach a desired temperature more quickly than would that of a conventional insulated baking tray when placed within the same oven for the same amount of time. Accordingly, when baking food (e.g., cookies) on a baking tray in accordance with the teachings of the present invention, the food can finish baking more quickly than if the same food were baked on a conventional insulated baking tray, and the bottom of the food would not typically be burned.

Figure 4:
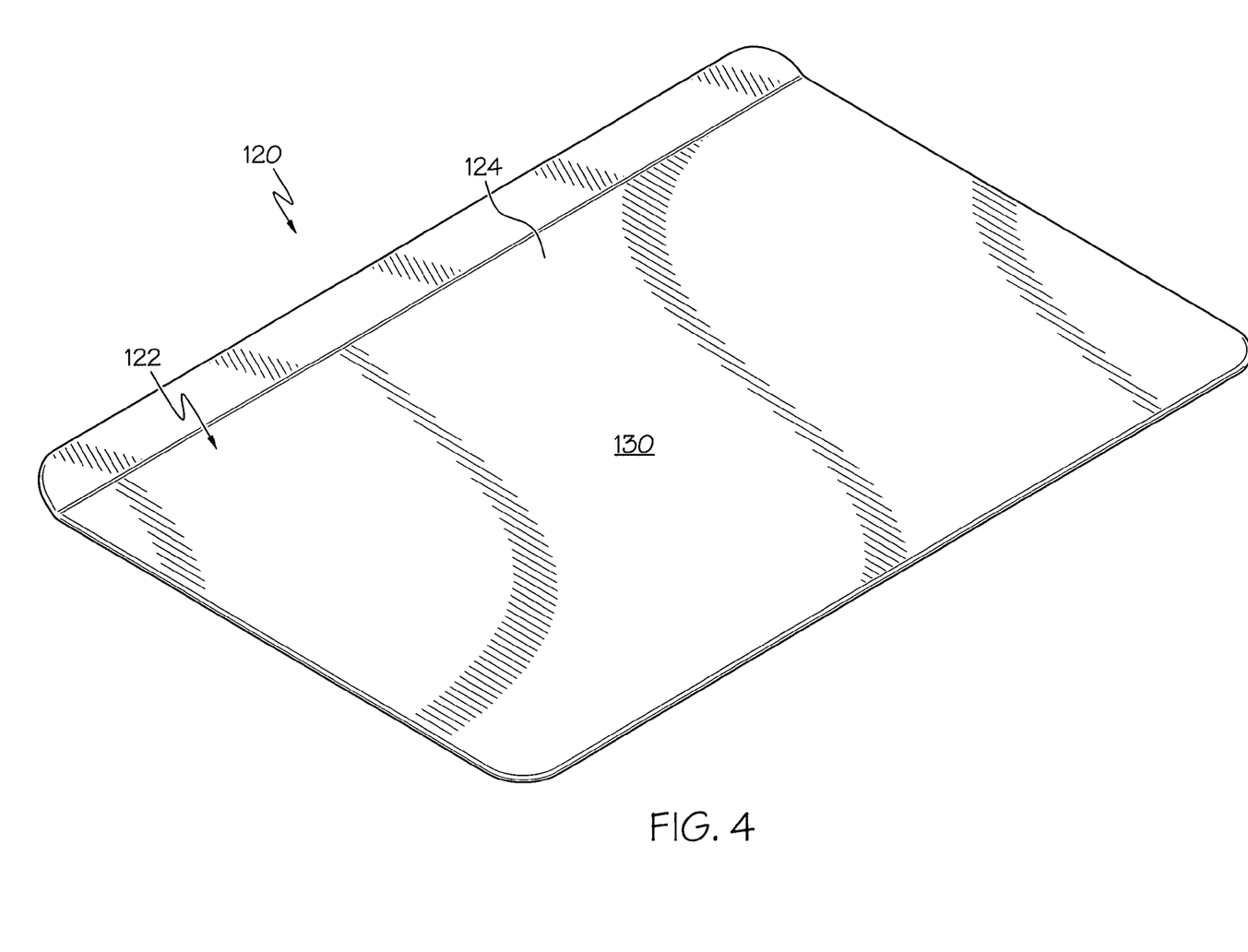
FIG. 4 is a top perspective view depicting a baking sheet in accordance with another embodiment of the present invention.
Figure 5:
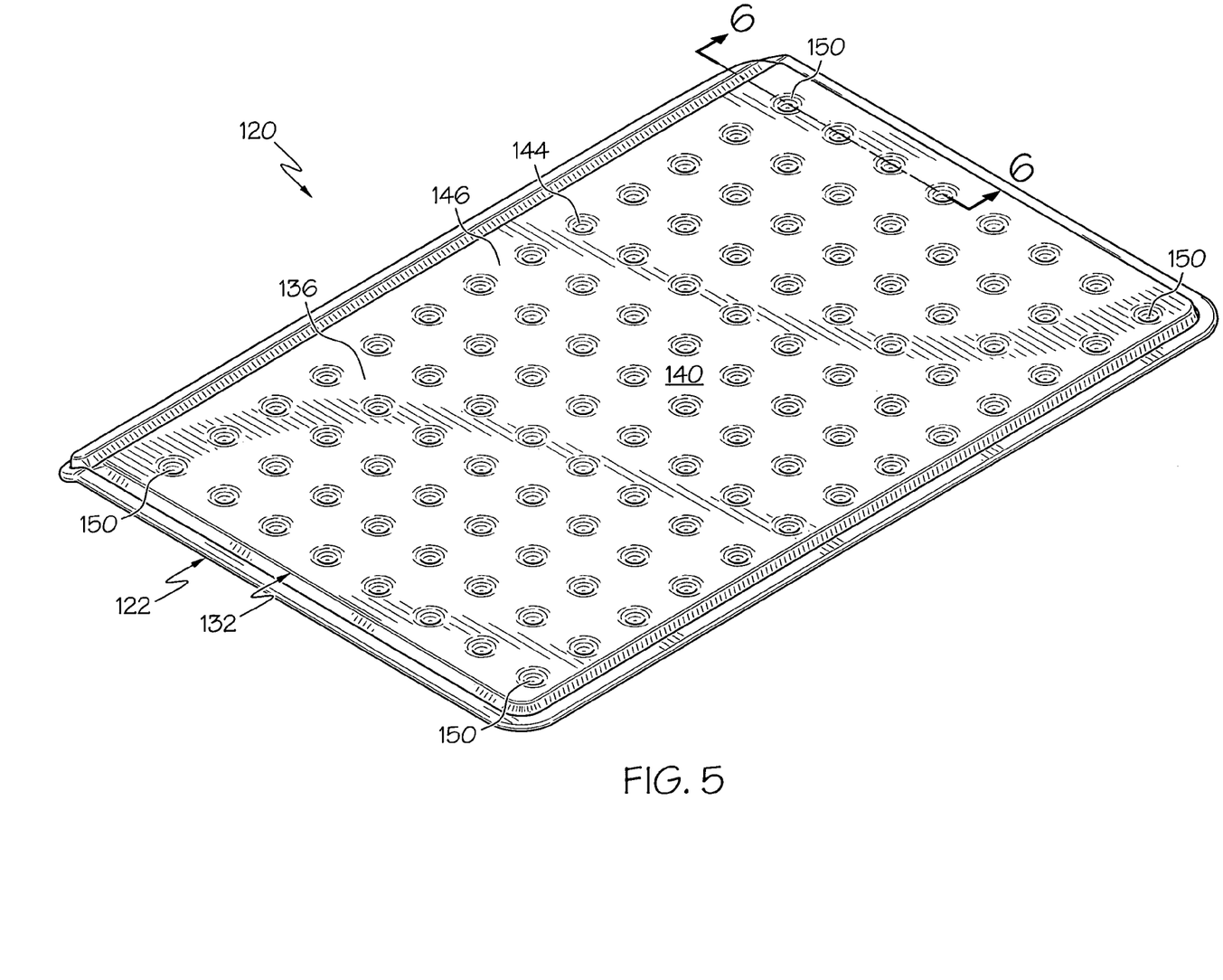
FIG. 5 is a bottom perspective view depicting the baking sheet of FIG. 4.
Figure 6:
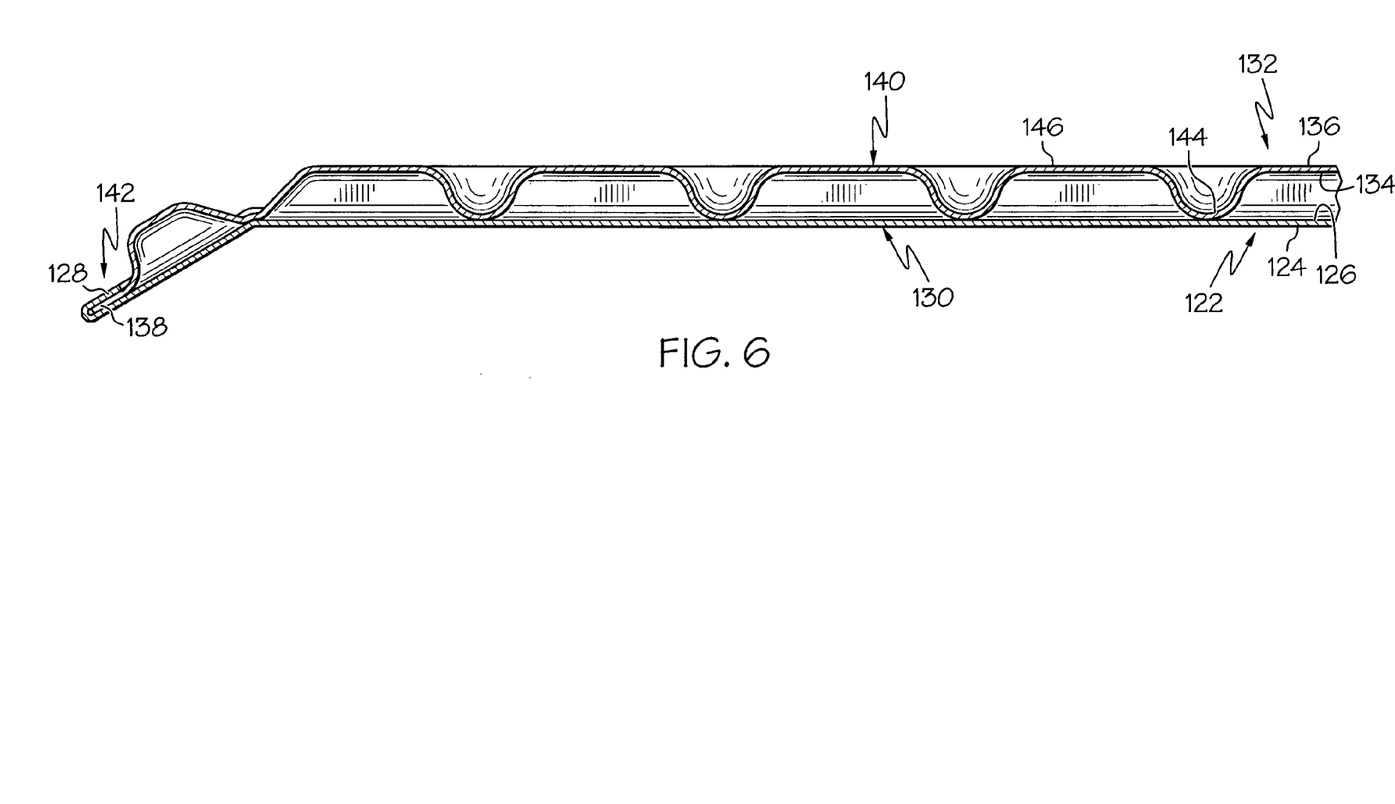
FIG. 6 is a sectional view depicting the baking sheet of FIGS. 4-5 taken along section lines 6-6 of FIG. 5.

An alternative baking tray in accordance with the teachings of the present invention is depicted in FIGS. 4-6 to comprise a baking sheet 120. The baking sheet 120 is shown to include a top sheet 122 and a bottom sheet 132 which are attached at an interface 142 adjacent to a first outer perimeter 128 of the top sheet 122 and a second outer perimeter 138 of the bottom sheet 32. The top sheet 122 includes a first top side 124 and a first bottom side 126. A portion of the first top side 124 provides a first horizontal surface 130 which is suitable to support food for cooking. The bottom sheet 132 includes a second top side 134 and a second bottom side 136. A portion of the second bottom side 136 provides a second horizontal surface 140 which is suitable to contact an oven rack during use. The second horizontal surface 140 includes dimple portions 144 and flat portions 146. The dimple portions 144 can be sized, spaced, and provided in such quantity as discussed above.

Figure 7:
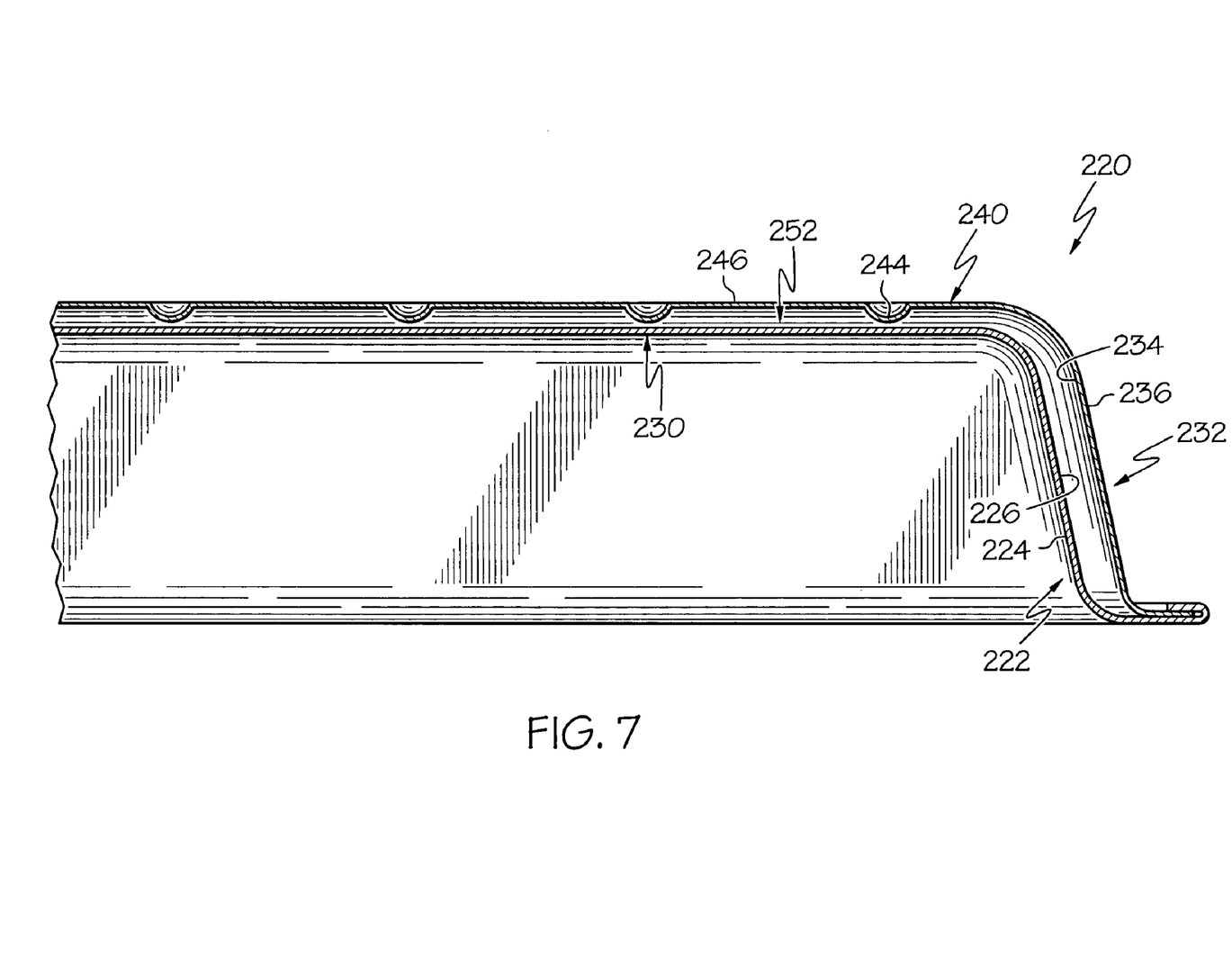
FIG. 7 is a sectional view depicting a portion of a baking tray in accordance with yet another embodiment of the present invention.

FIG. 7 depicts a portion of a baking tray 220 in accordance with another embodiment of the present invention, wherein an alternate suitable arrangement of dimple portions is provided. In particular, a top sheet 222 is shown to include a first top side 224 and a first bottom side 226. A portion of the first top side 224 provides a first horizontal surface 230 which is suitable to support food for cooking. A bottom sheet 232 is shown to include a second top side 234 and a second bottom side 236. A portion of the second bottom side 236 provides a second horizontal surface 240 which is suitable to contact an oven rack during use. The second horizontal surface 240 includes dimple portions 244 and flat portions 246. When the top sheet 222 is attached to the bottom sheet 232 as shown in FIG. 7, an air gap 252 can remain between the top sheet 222 and the bottom sheet 232. Even though the dimple portions 244 might not indent insofar as to touch the top sheet 222, the baking tray 220 can still achieve the improved baking performance discussed herein as compared to conventional insulated bakeware.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A baking tray comprising:
  a top sheet having a first top side, a first bottom side, and a first outer perimeter, the first top side including a first horizontal surface configured for supporting food for cooking in an oven; and
  a bottom sheet having a second top side, a second bottom side, and a second outer perimeter, the second bottom side including a second horizontal surface configured for supporting the baking tray upon an oven rack, wherein the bottom sheet is attached to the top sheet at an interface adjacent to the first outer perimeter and the second outer perimeter, the second horizontal surface comprises a plurality of spaced apart dimple portions separated on all sides by flat portions, the flat portions are defined by the second top side and the second bottom side and are spaced from the top sheet, each of the dimple portions are indented toward the top sheet, the dimple portions are substantially evenly distributed across the entirety of the second horizontal surface, such that the first horizontal surface is substantially evenly heated by the second horizontal surface when the baking tray is placed into a heated oven, and such that the first horizontal surface is heated more rapidly than that of a double-walled baking tray not having the substantially evenly distributed dimple portions,
  wherein each of the dimple portions is a spherical indentation of substantially uniform size and shape, are substantially evenly distributed across the entirety of the second horizontal surface, and are arranged in substantially straight rows and in substantially straight columns, and
  wherein the second horizontal surface has a surface area extending along perpendicular axes, and each of the dimple portions is spaced from every other adjacent one of the dimple portions by a distance no greater than about 10% of the shortest span of the surface area along either of the axes.

2. The baking tray of claim 1 wherein each of the flat portions of the bottom sheet are substantially parallel with corresponding portions of the top sheet.

3. The baking tray of claim 1 wherein at least some of the dimple portions contact the top sheet.

4. The baking tray of claim 3 wherein each of the dimple portions contacts the top sheet.

5. The baking tray of claim 1 wherein none of the dimple portions contacts the top sheet.

6. The baking tray of claim 1 wherein at least about 5% of the surface area of the second horizontal surface is provided by the dimple portions.

7. The baking tray of claim 6 wherein at least about 10% of the surface area of the second horizontal surface is provided by the dimple portions.

8. The baking tray of claim 7 wherein at least about 15% of the surface area of the second horizontal surface is provided by the dimple portions.

9. The baking tray of claim 1 comprising at least thirty-two of the dimple portions.

10. The baking tray of claim 9 comprising at least sixty-four of the dimple portions arranged into at least eight rows and at least eight columns.

11. The baking tray of claim 1 wherein each of the dimple portions has substantially the same diameter and is spaced from every other adjacent one of the dimple portions by a distance no greater than about five times the diameter.

12. A baking tray comprising: a top sheet having a first top side, a first bottom side, and a first outer perimeter, the first top side including a first horizontal surface configured for supporting food for cooking in an oven; and a bottom sheet having a second top side, a second bottom side, and a second outer perimeter, the second bottom side including a second horizontal surface configured for supporting the baking tray upon an oven rack, wherein the bottom sheet is attached to the top sheet at an interface adjacent to the first outer perimeter and the second outer perimeter, the second horizontal surface comprises dimple portions separated on all sides by flat portions, the flat portions are defined by the second top side and the second bottom side and are spaced from the top sheet, each of the dimple portions are indented toward the top sheet, and each of the dimple portions has substantially the same diameter and is spaced from every other adjacent one of the dimple portions by a distance no greater than about five times the diameter, wherein each of the dimple portions is a spherical indentation of substantially uniform size and shape, are substantially evenly distributed across the entirety of the second horizontal surface, and are arranged in substantially straight rows and in substantially straight columns, and wherein at least about 10% of the surface area of the second horizontal surface is provided by the dimple portions;

wherein the second horizontal surface has a surface area extending along perpendicular axes, and each of the dimple portions is spaced from every other adjacent one of the dimple portions by a distance no greater than about 10% of the shortest span of the surface area along either the axes.

13. The baking tray of claim 12 wherein at least about 15% of the surface area of the second horizontal surface is provided by the dimple portions.

14. The baking tray of claim 12 comprising at least sixty-four of the dimple portions arranged into at least eight rows and at least eight columns.

15. A baking tray comprising:
a top sheet having a first top side, a first bottom side, and a first outer perimeter, the first top side including a first horizontal surface configured for supporting food for cooking in an oven; and
a bottom sheet having a second top side, a second bottom side, and a second outer perimeter, the second bottom side including a second horizontal surface configured for supporting the baking tray upon an oven rack, wherein the bottom sheet is attached to the top sheet at an interface adjacent to the first outer perimeter and the second outer perimeter, the second horizontal surface comprises a plurality of spaced apart dimple portions separated on all sides by flat portions, the flat portions are defined by the second top side and the second bottom side and are spaced from the top sheet, each of the dimple portions are indented toward the top sheet, the dimple portions are substantially evenly distributed across the entirety of the second horizontal surface, such that the first horizontal surface is substantially evenly heated by the second horizontal surface when the baking tray is placed into a heated oven, and such that the first horizontal surface is heated more rapidly than that of a double-walled baking tray not having the substantially evenly distributed dimple portions,
wherein the second horizontal surface has a surface area extending along perpendicular axes, and each of the dimple portions is spaced from every other adjacent one of the dimple portions by a distance no greater than about 10% of the shortest span of the surface area along either of the axes.

\* \* \* \* \*